United States Patent
Pezzani

(10) Patent No.: US 7,130,455 B2
(45) Date of Patent: Oct. 31, 2006

(54) CAPACITIVE MICROSENSOR

(75) Inventor: Robert Pezzani, Vouvray (FR)

(73) Assignee: STMicroeletronics S.A., Montrouge (FR)

(*) Notice: Subject to any disclaimer, the term of this patent is extended or adjusted under 35 U.S.C. 154(b) by 710 days.

(21) Appl. No.: 10/098,154

(22) Filed: Mar. 13, 2002

(65) Prior Publication Data

US 2002/0130671 A1    Sep. 19, 2002

(30) Foreign Application Priority Data

Mar. 14, 2001  (FR) .................................. 01 03471

(51) Int. Cl.
*G06K 9/00* (2006.01)

(52) U.S. Cl. .................... 382/124; 356/71; 348/294; 438/524

(58) Field of Classification Search ................ 382/124, 382/125; 356/71; 348/294; 438/524
See application file for complete search history.

(56) References Cited

U.S. PATENT DOCUMENTS

| | | | |
|---|---|---|---|
| 5,270,710 A | | 12/1993 | Gaultier et al. |
| 5,757,081 A | * | 5/1998 | Chang et al. ............... 257/778 |
| 5,778,089 A | * | 7/1998 | Borza ......................... 382/124 |
| 5,862,248 A | | 1/1999 | Salatino et al. |
| 5,956,415 A | | 9/1999 | McCalley et al. |
| 6,088,471 A | | 7/2000 | Setlak et al. |
| 6,307,258 B1 | * | 10/2001 | Crane et al. ............... 257/680 |
| 6,317,508 B1 | | 11/2001 | Kramer et al. |
| 6,563,215 B1 | * | 5/2003 | Akram et al. ............... 257/737 |
| 6,838,362 B1 | * | 1/2005 | Mastromatteo et al. ..... 438/524 |
| 2001/0043728 A1 | | 11/2001 | Kramer et al. |

OTHER PUBLICATIONS

French Search Report from French Patent Application 01/03471, filed Mar. 14, 2001.

* cited by examiner

*Primary Examiner*—Bhavesh M. Mehta
*Assistant Examiner*—John Strege
(74) *Attorney, Agent, or Firm*—Lisa K. Jorgenson; James H. Morris; Wolf, Greenfield & Sacks, P.C.

(57) ABSTRACT

A capacitive microsensor formed on a wafer, including a conductive detection area arranged on a first surface or front surface of the wafer; a conductive via crossing the wafer and emerging on said area; and a structure to ensure contact with said via on the second surface or rear surface of the wafer.

32 Claims, 1 Drawing Sheet

CAPACITIVE MICROSENSOR

BACKGROUND OF THE INVENTION

1. Field of the Invention

The present invention relates to a static capacitive microsensor especially enabling determination of a distance variation between the microsensor and a charged surface having a relative motion with respect to the microsensor.

The present invention especially applies to a fingerprint detector.

2. Discussion of the Related Art

FIG. 1 shows a conventional capacitive microsensor for detection of fingerprints. This microsensor includes a set of detection sites 1 arranged in one or several rows. The microsensor is formed on an insulating wafer 2, for example made of glass or silica or a flexible material. On wafer 2 are formed conductive regions 3, end areas 4 of which are placed in front of the detection sites. Conductive regions 3 are coated with an insulating layer 5 above which is formed a conductive layer 6 including windows in front of the detection sites. Conductive layer 4 is coated with an insulating layer 7 coated with a conductive layer 8 also including windows at the level of each detection site. The substrate is crossed by conductive vias. First vias 11 contact regions 3, a second via 12 contacts layer 6, and a third via 13 contacts layer 8. Each of the vias ends with a connection pad, respectively 14, 15, 16. It should be understood that there exists one detection area 4 for each window 1, while conductive layer 6 and conductive layer 8 are common to the entire structure. For practical reasons, the lower surface of substrate 2 is coated with an insulating layer 18, this insulating layer being possibly coated with a conductive shielding layer (not shown) open at the pad locations.

Regions 3 are connected to a detection circuit by pads 14. Layer 6 is connected to ground by pad 15. Layer 8 is connected to a high-frequency generator by pad 16. Thus, when an isolating surface, for example, a finger, is moved with respect to microsensor row 1, this surface is charged by the high-frequency signal and the capacitance between the surface portion passing above a detection area and this detection area varies according to the distance between the surface portion passing above the detection area (hollow or relief of a fingerprint) and this area. The successive relieves of a fingerprint may thus be detected at the location of each detection area. Various means are known in the art to perform the measurements. Some of these means are described in European patent application 1058531 of Idex AS Company, which is incorporated herein by reference.

SUMMARY OF THE INVENTION

The present invention aims at improving the sensitivity of this type of capacitive micro sensor.

Another object of the invention is to provide a capacitive microsensor that can be integrated with other electronic components.

To achieve these and other objects, the present invention provides a capacitive microsensor formed on a wafer, including a conductive detection area arranged on a first surface or front surface of the wafer; a conductive via crossing the wafer and emerging on said area; and a means of contact recovery with said via on the second surface or rear surface of the wafer, wherein the substrate is made of silicon, the walls of the via and the surfaces of the substrate are oxidized.

The present invention also provides a fingerprint detector including a set of microsensors such as mentioned above.

The foregoing objects, features and advantages of the present invention, as well as others will be discussed in detail in the following non-limiting description of specific embodiments in connection with the accompanying drawings.

DETAILED DESCRIPTION

As is conventional in the representation of microcomponents, the various drawings are not drawn to scale. Further, those portions common to the structures of the various drawings have been designated with the same references.

Figure 1:
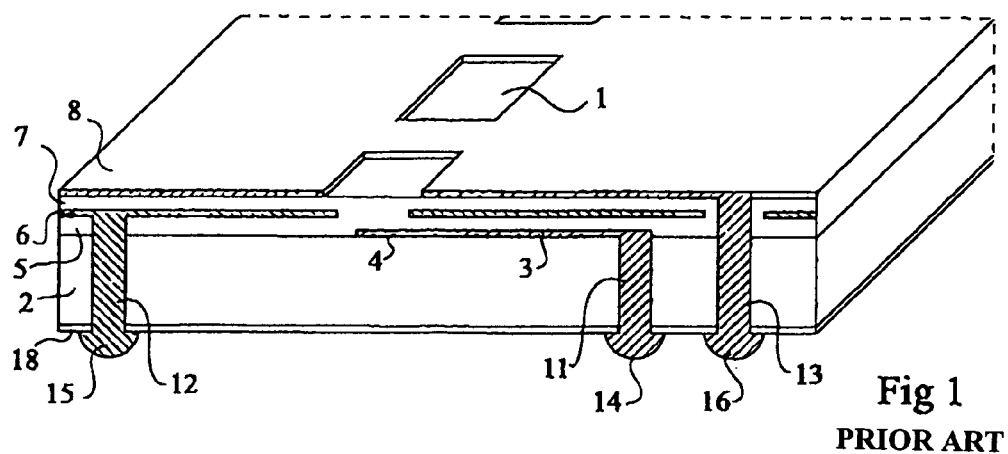
FIG. 1, previously described, is a partial perspective view of an example of a microsensor according to prior art.

The present invention is based on an analysis of the operation of the structure of FIG. 1. The microsensor sensitivity appears to depend on the distance between the surface to be sensed and the top of detection area 4. This distance is set by the thicknesses of insulating layers 5 and 7. Excessively reducing these thicknesses makes the structure too fragile or impossible to form. Thus, the present inventor has analyzed in further detail the structure and especially the function of the grounded shielding layer 6. The main function of layer 6 is to avoid any interference between the high frequencies on upper electrode 8 and detection electrode 4, and especially conductor 3 connected to this detection electrode.

Rather than modifying the structure of shielding electrode 6, the present invention provides modifying the connection mode of detection area 4 to avoid the need for the shielding electrode.

Figure 2:
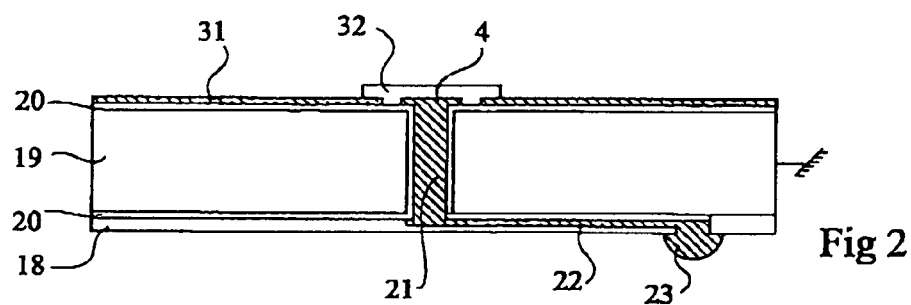
FIGS. 2 to 4 show various embodiments of a microsensor according to the present invention.

FIG. 2 illustrates a first embodiment of the present invention. Substrate 2 is a doped, and thus conductive, silicon substrate 19, and is grounded. The via intended to contact detection area 4 is arranged directly under this area. Before forming the conductive via layer in the opening arranged under detection area 4, the entire structure is oxidized to insulate the silicon 19. The via is designated with reference 21. If the contact pad has to be displaced on the lower surface, a conductive layer 22, extending to reach a connection pad 23, is provided on the lower surface side. The electrode receiving a high frequency, or biasing metallization, designated with reference 31, is etched in the same conductive layer as detection area 4. An insulating layer 32 covers at least the detection area 4. Due to the large thickness of wafer 19, for example, on the order of from 0.3 to 0.5 mm, as compared to the thickness of an insulating layer, the coupling between upper electrode 31 and connection 22 is negligible. Shielding electrode 6 can thus be omitted. Thus, there is a single insulating layer thickness, 20, between the substrate and upper electrode 31, this layer having the function of insulating area 4 from the surface, for example, a finger, to be analyzed. The substrate grounding avoids any parasitic coupling between upper electrode 31 and the other conductive layers of the structure.

Figure 3:
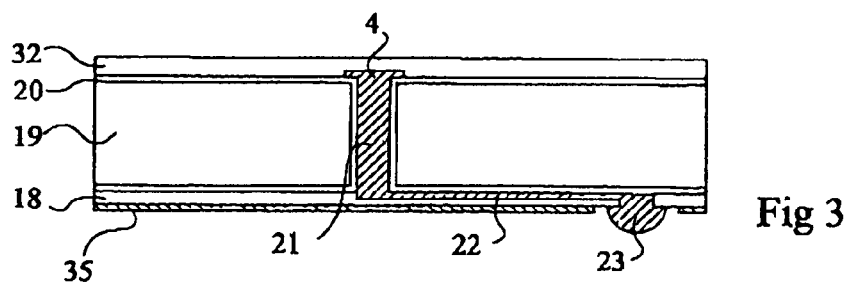

FIG. 3 shows a second embodiment of the present invention. In this embodiment, biasing metallization 31 is eliminated. The biasing of the surface to be analyzed is performed by a contact with a portion of the surface to be analyzed external to the sensor area. For example, if the fingerprint of one finger is desired to be analyzed, a high-frequency voltage will be applied to another finger. A conductive shielding layer 35, which is preferably grounded, has also been shown in FIG. 3, on the rear surface side.

Figure 4:
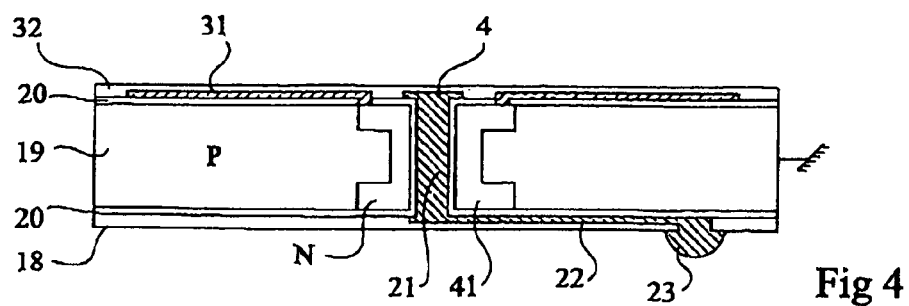

FIG. 4 shows a third embodiment of the present invention formed from a silicon substrate 19 of a first conductivity type, for example, P. This substrate is first pierced with openings located at the locations of the vias to be formed. A doping of opposite type is formed by diffusion in the vicinity of the openings, doped area 41 extending beyond detection areas 4, to partially extend under a biasing metallization 31. As in the embodiment of FIG. 2, high-frequency biasing metallization 31 and detection areas 4 are formed from a same conductive layer. (As in FIG. 2, the via of contact with metallization 31 is not shown). The upper and lower substrate surfaces and the via walls are coated with a thin insulating layer 20, for example by thermal oxidation to insulate the various conductive layers of the substrate. Insulating layer 20 is opened, for example, in a ring, in front of a portion of the lateral extension of N-type region 41, so that metallization 31 is in contact with this region. Metallization 31 is, as previously, connected to a high-frequency generator, but the voltage which is applied thereto also includes a positive D.C. bias voltage to reversibly bias NP junction 41-19. Substrate 19 being grounded, an integrated protection against possible overvoltages is thus obtained. On the other hand, the parasitic coupling between the conductor of via 21 and the substrate is avoided due to the positive biasing of the N region. This biasing may, for example, be on the order of from 2 to 3 volts.

Those skilled in the art will be able to implement the various embodiments of the present invention by using the various materials currently used in semiconductor manufacturing. The biasing and detection conductive layers will, for example, be doped polysilicon layers, or layers made of a metal such as aluminum or another known metal for forming metallizations. The insulating layers on the upper surface side will, for example, be silicon oxide and/or nitride layers or layers made of another conventional insulator. The insulating layers on the lower surface side will, for example, be silicon oxide layers or polymer layers. The layer thicknesses will, for example, be on the order of from 0.1 to 0.2 µm for insulating layers and on the order of from 0.1 to 2 µm for conductive layers.

The present invention is likely to have various alterations, modifications, and improvements which will readily occur to those skilled in the art. Various means other than vias may for example be used to ensure a contact with the conductive biasing layer. The features illustrated in the various drawings may be combined, for example, shielding layer 35 shown in FIG. 3 on the lower surface side may be used in the various embodiments. Additionally, various active or passive electronic components can be implemented in or above the silicon substrate 19. Also, the substrate could be of the SOI type.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A capacitive microsensor formed on a wafer, including:
  a conductive detection area arranged on a first surface or front surface of the wafer;
  a conductive via crossing the wafer and connected to said area; and
  a means for making contact with said via on the second surface or rear surface of the wafer,
  wherein the wafer is made of silicon, the walls of the via and the surfaces of the wafer are oxidized, wherein the conductive detection area is configured to detect at least a portion of a finger, the finger being electrically biased via an electrode that does not contact the finger.

2. The microsensor of claim 1, wherein the conductive detection area is surrounded with a high-frequency biasing electrode, the conductive detection area and a portion at least of the biasing electrode being covered with an insulating layer.

3. The microsensor of claim 1, wherein the wafer is grounded and the walls of the via corresponding to the detection area is surrounded with a semiconductive area of a type opposite to that of the wafer, a biasing electrode being connected to said semiconductive area through an opening formed in the oxide layer arranged above the wafer.

4. A fingerprint detector including a set of the microsensors of claim 1.

5. An apparatus, comprising:
  a conductive substrate;
  a conductive via defined through the substrate so that a signal capacitively detected at a first side of the conductive substrate is conducted through the conductive via to a second side of the conductive substrate; and
  a first insulating layer formed at least along a boundary of the conductive via and the conductive substrate, wherein the first insulating layer also is formed on a bottom surface and a top surface of the substrate, a first conductive layer disposed above the first insulating layer on the top surface of the substrate and having a window defined therethrough, and a detection area aligned with the window and coupled to the conductive via.

6. The apparatus of claim 5, further comprising:
  a second insulating layer disposed above and in contact with the detection area.

7. The apparatus of claim 6, wherein the apparatus further comprises:
  a conductive contact coupled to the conductive via.

8. The apparatus of claim 7, wherein the apparatus further comprises:
  a second conductive layer connecting the conductive via to the conductive contact.

9. The apparatus of claim 8, wherein the apparatus further comprises:
  a second insulating layer formed at least partially on the bottom surface of the substrate and the second conductive layer.

10. The apparatus of claim 5, wherein the conductive substrate is configured to be coupled to ground during electrical operation of the apparatus.

11. The apparatus according to claim 5, wherein the apparatus further comprises:
  a detection area coupled to the conductive via.

12. The apparatus according to claim 11, wherein the detection area is disposed at the top surface of the substrate.

13. The apparatus according to claim 12, wherein the detection area is disposed at or above a level of the first insulating layer.

14. The apparatus according to claim 13, wherein the apparatus further comprises:
  a second insulating area disposed at least partially over the first insulating layer and the detection area.

15. The apparatus according to claim 14, further comprising:
a conductive contact coupled to the conductive via.

16. The apparatus according to claim 15, further comprising:
a second conductive layer connecting the conductive via and the contact.

17. The apparatus according to claim 16, wherein the apparatus further comprises:
a third insulating area formed at least partially on the first insulating layer on the bottom surface of the substrate and the second conductive layer.

18. The apparatus according to claim 11, wherein the conductive substrate is a doped semiconductor.

19. The apparatus according to claim 18, wherein the conductive substrate includes at least one first conductivity type region and at least one second conductivity type region.

20. The apparatus according to claim 19, further comprising:
a first conductive layer disposed above the first insulating layer on the top surface of the substrate and having a window defined therethrough.

21. The apparatus according to claim 20, wherein the at least one first conductivity type region is in contact with the first conductive layer.

22. The apparatus according to claim 20, wherein the at least one first conductivity type region is formed adjacent to the first insulating layer along the boundary of the conductive via.

23. The apparatus according to claim 22, wherein the at least one first conductivity type region is in contact with the first conductive layer.

24. The apparatus according to claim 23, wherein the at least one first conductivity type region and the at least one second conductivity type region form at least one P-N junction.

25. The apparatus according to claim 24, wherein the first conductivity type region is an N-type region and the second conductivity type region is a P-type region.

26. A fingerprint detection device, comprising:
at least one apparatus according to claim 5.

27. An apparatus, comprising:
a substrate;
a first conductive layer disposed above a top surface of the substrate and having a window defined therethrough;
a detection area at the level of the window; and
a conductive via defined through the substrate, coupled to the detection area and aligned with the window.

28. A fingerprint detection device, comprising:
at least one apparatus according to claim 27.

29. An apparatus, comprising:
a substrate;
a conductive via defined through the substrate;
a first conductive layer disposed above a top surface of the substrate and having a window defined therethrough;
a detection area coupled to the conductive via aligned with and at the level of the window defined through the first conductive layer, the detection area being electrically insulated from the first conductive layer; and
a second insulating layer disposed above the detection area.

30. A fingerprint detection device, comprising:
at least one apparatus according to claim 29.

31. An apparatus, comprising:
a conductive substrate;
a detection area located at a top surface of the conductive substrate;
a first insulating layer disposed above the top surface of the conductive substrate; and
a conductive via defined through the conductive substrate and aligned directly below and in contact with the detection area so that a signal capacitively detected at the detection area is conducted through the conductive via to a bottom surface of the conductive substrate.

32. A fingerprint detection device, comprising:
at least one apparatus according to claim 31.

* * * * *